June 2, 1942.  W. C. GRABAU  2,284,649
ELECTRICAL CONTROL APPARATUS
Filed Jan. 28, 1941  2 Sheets-Sheet 1

INVENTOR.
William Christian Grabau
BY Ezekiel Wolf
his ATTORNEY

Patented June 2, 1942

2,284,649

UNITED STATES PATENT OFFICE 2,284,649

ELECTRICAL CONTROL APPARATUS

William Christian Grabau, Brighton, Mass., assignor to Submarine Signal Company, Boston, Mass., a corporation of Maine Application January 28, 1941, Serial No. 376,303

9 Claims. (Cl. 171—119)

The present invention relates to voltage and frequency control of an alternating current source and particularly to a motor generator set where the alternator depends upon the speed of the set for its frequency and upon its speed and field strength for its voltage.

Variations in voltage and frequency may occur because of sudden increase in load or changes in applied voltages to the motor driving unit. When the alternating current load increases, the impedance drops in the line and generator vary or generally increase, lowering the voltage and ultimately the frequency of the alternating source. In addition, changes in frequency and voltage will occur with changes in speed of rotation of the motor generator set. While changes in voltage may be compensated either by change of speed or field excitation, since changes in frequency may only be compensated by changes of speed, it follows that where the frequency is to remain the same, the speed of the rotating generator must be kept as nearly constant as possible. In the present system, therefore, the frequency is the basic constant standard and the field excitation of the generator furnishes the variable factor to maintain constant voltage output.

In the present invention field excitation of the motor driving source is controlled by a shunt across the field with an adjustable resistance in series with both field and shunt connected to the line. Varying the resistance in the shunt varies the potential applied across the field and, therefore, the field excitation. Variations in shunt resistance in the present invention is controlled by pulsating plate current in a thyratron tube circuit, which, together with control of potential applied to the grid, controls the portion of the cycle in which the tube is conductive. This control works to maintain the proper excitation to maintain the speed of the alternating current source constant. The control of the voltage developed by the generator is controlled as a secondary factor to the speed of the machine; that is, since the speed must be entirely controlled by the motor field strength, the voltage is controlled by the supplementary control of the generator field acting through gaseous controlled rectifier tubes operated from the alternating current source.

Figure 1:
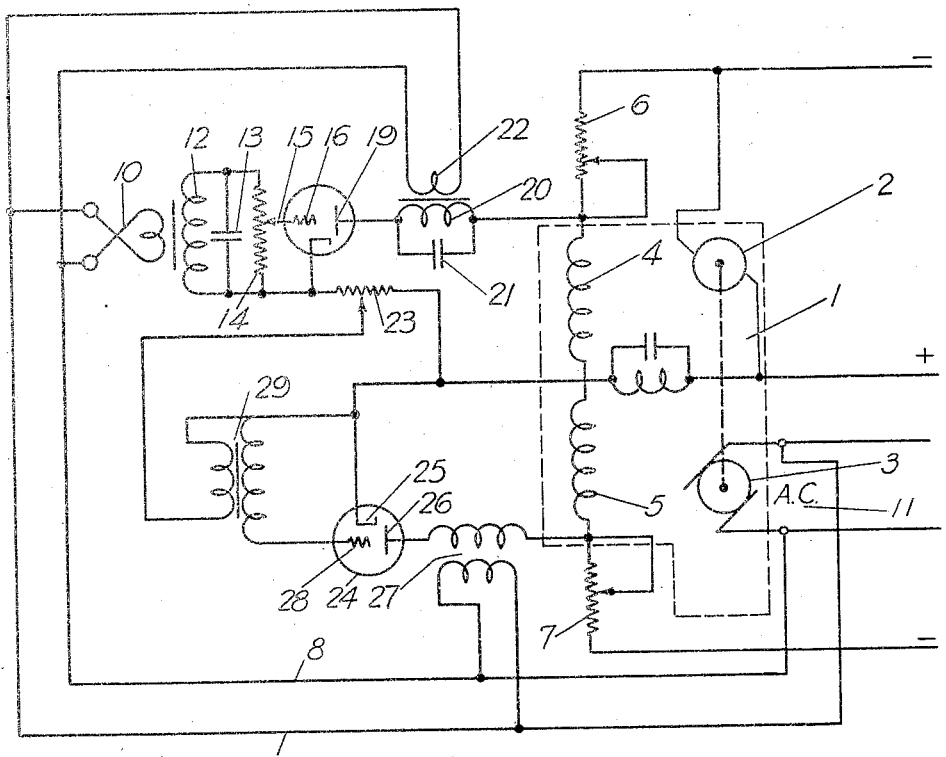
Figure 1A:
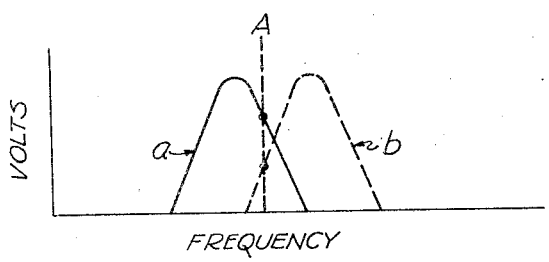
Figure 2:
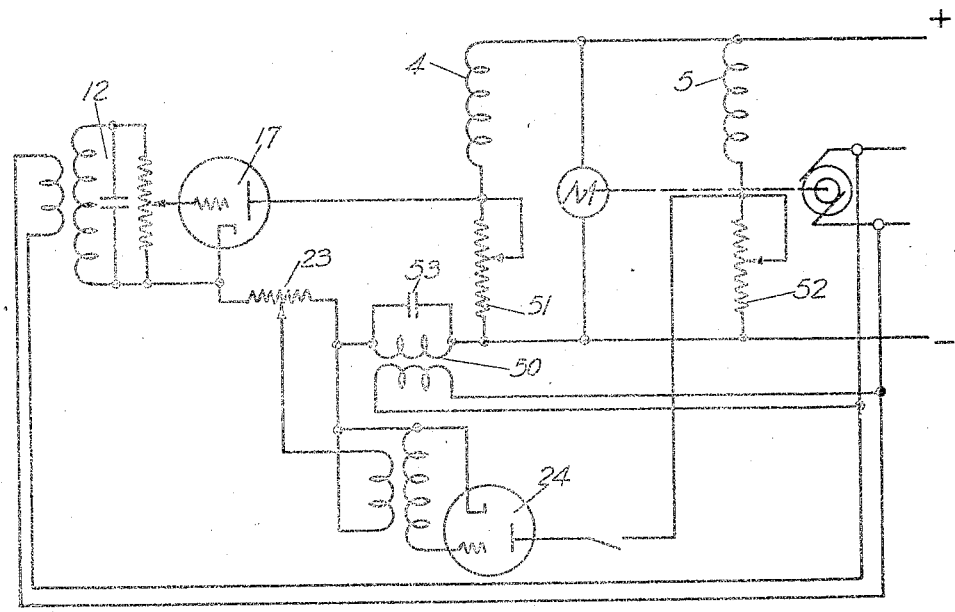
Figure 3:
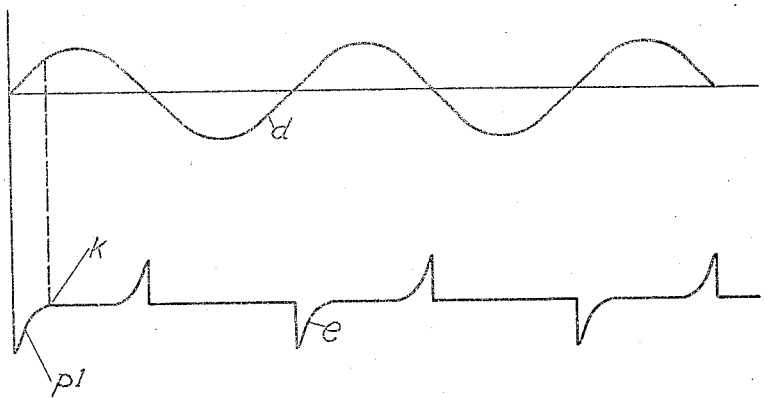

The objects and advantages of the present invention will be more fully understood from the explanation in the following specification describing an embodiment of the invention and referring specifically to the drawings illustrating the invention in which Fig. 1 shows a circuit diagram of one form of the invention; Fig. 1a shows a curve applying to Fig. 1; Fig. 2 shows a modification of the circuit of Fig. 1; and Fig. 3 shows the operational characteristic of a part of the circuit as applied either to Figs. 1 and 2.

Referring to Fig. 1, I represents the motor generator set whose output voltage and frequency it is desired to regulate. This unit may comprise a motor 2 and a generator 3 built on the same shaft. The machine is shown with shunt motor field 4 and shunt generator field 5 which may be part or the whole of the field excitation. If desired, other shunt and series fields may be used, but the control as here indicated is applied to the shunt field connections.

It is well known in the operation of such machines that decreasing the shunt motor field causes the machine to rotate faster and increasing the generator field increases the generated EMF. The opposite actions have the opposite effects. It is also known that increasing the rotor speed, increases the frequency; and decreasing the speed, decreases the frequency.

As indicated in Fig. 1, both fields 4 and 5 are respectively in series with adjustable resistances 6 and 7, the field and the resistance being connected across the direct current line. A pair of leads 8 and 9 connects the transformer 10 across the alternating current supply source 11 whose frequency and voltage is to be regulated and maintained constant. The secondary 12 of the transformer is tuned to resonance by a condenser 13 at a frequency below the operating frequency of the circuit. For instance, if the operating frequency is 60 cycles, the resonance may be about 40 cycles. The output of the tuned circuit is connected across the drop wire 14, and an adjustable tap 15 is taken off this wire and connected to the control grid 16 of a thyratron tube 17. The cathode 18 of the same tube is connected to one terminal of the tuned circuit and the anode 19 is in a series circuit with a second tuned circuit 20, made up of the condenser 21 and the transformer 22, the direct current field winding 4, the slide wire resistor 23 and the cathode 18. The transformer 22 is also energized from the alternating current source to be regulated through the leads 8 and 9. The circuits just described control, as will be explained, the current supplied to the field winding 4 and therefore the speed of the machine and the alternating current frequency.

A second thyratron tube 24 has its cathode 25 and anode 26 in series with the field coil 5 of the alternator and controls the alternator field and thereby the alternating current voltage. An alternating current potential is placed in series in this cathode-anode circuit by means of the transformer 27 connected across the leads 8 and 9, and a rectified alternating current potential supplied through the potentiometer 23 is fed into the grid circuit between the cathode 25 and the grid 28 by means of the transformer 29.

The tuned circuit 12 in the grid input of the speed control circuit has a resonance curve as indicated by $a$ in Fig. 1a, while the plate tuned circuit 20 has a resonance curve as indicated by $b$ in Fig. 1a. The normal point of operation of the system is placed between the two peaks, not necessarily at the intersection of the curves. If line A represents the normal operating frequency, it is evident that a sudden increase in frequency will produce a decrease in voltage across the tuned circuit 12 and an increase in voltage across the tuned circuit 20. The transformer 10 is connected in reverse position to the transformer 22 so that the phase of the grid is negative while the plate is positive, and therefore with a decrease in the negative grid bias, there will also be an increase in the plate potential. This means that the tube 17 will pass more current for relatively longer time intervals, passing a rectified alternating current impulse in the tube 17 for a longer period of time in the same direction corresponding to the direct current in the field 4, thus increasing the field and therefore decreasing the speed of the motor 2 and the alternating current frequency. The decrease of the frequency will cause the operation to return to the line A if that was the point of operation. If the frequency should drop below the line A, the plate voltage will decrease and the grid voltage will have its bias increased, thus permitting the tube 17 to pass less current for relatively shorter time intervals, decreasing the length of the rectified alternating current impulse flowing in the direction of the direct current in the field 4, thus decreasing the field 4 to cause the motor to speed up until the frequency is brought back to the operating line A.

It will be noted from the description above that the gaseous control tube is operated by pulsating current which may pulsate as high, but no higher than the alternating current frequency. If the frequency to be maintained is, for instance, 60 cycles per second, then the line of operation A must be 60 cycles, and, therefore, the peak of the curve $b$ must be above, and that of curve $a$ below this point.

The pulsation of current in the anode cathode circuit will always occur whether the frequency is correct or not, since there is always a flow of current during part of the positive half cycle. This pulsation itself creates a balance and works against and prevents hunting of the generator by creating variations that alternate faster than the slower hunting oscillations. For the most part, the tube 17 discharges during a part of each positive half cycle, but the combination of an alternating current plate voltage and alternating current grid voltage controlled through their respective resonant circuits to provide the desired amplitude voltage produces the necessary variation of the interval of discharge to maintain the frequency constant.

The voltage control of the alternating current machine is obtained mainly, though not entirely, through control of the circuit involving the tube 24, as will be seen from the description below.

It will be noted that the voltage on the grid 28 is derived from the drop wire resistor 23 while the plate voltage is derived from the transformer 27. Fig. 3 shows in the curve $d$ the voltage impressed by the transformer 27 which is the alternating current voltage of the source to be regulated. While this voltage may vary, primarily the regulation is not obtained through this variation but rather through the grid control, as will presently be explained.

It may be shown that the voltage developed across the secondary of the transformer 29 is in the shape of the curve $e$ of Fig. 3 and that the position of the negative peak $p_1$ may be controlled by the current flow in the resistor 23 in the anode-cathode circuit of the tube 17. When the tube 17 is firing during the greater part of its positive half cycle, the negative peak $p_1$ of curve $e$ is at the beginning of the positive half of the alternating current cycle $d$, and discharge in the tube 24 is delayed until the voltage on the grid returns to approximately zero at the point $k$. If, however, the peak $p_1$ is moved over to the right because current in the resistor 23 is delayed, then the tube 24 will discharge immediately upon the commencement of the positive half cycle and continue until the end of the cycle or thereabout.

When, therefore, more current is flowing in anode-cathode circuit of tube 17, less current will be flowing in the anode-cathode circuit of tube 4. A smaller alternating current component in the generator circuit will correspond to a large alternating current component in the motor circuit. While, therefore, the motor is coming down to normal speed, the voltage is also coming down through decrease in field current.

It is obvious that the reverse action will take place when the frequency and voltage drop. The alternating current component of the generator field will increase and the alternating current component of the motor field will decrease, thus bringing the machine up to frequency and voltage.

The arrangement shown in Fig. 2 differs from that of Fig. 1 in a number of respects. A single transformer 50 acts to furnish the anode-cathode alternating current component for both tubes 17 and 24. The transformer 50 is tuned by a condenser 53 and the anode-cathode circuit of tube 51 has the resistor 23 as in Fig. 1. The anode-cathode circuit of tube 17 in Fig. 2 is connected to the terminals of the motor field resistance 51 and the anode-cathode circuit of tube 24 to the terminals of the generator field resistance 52.

In Fig. 2 when the tube 17 breaks down, direct current through the field 4 will flow through anode-cathode circuit increasing the field current. If the grid of the tube 17 becomes less negative, as explained in connection with Fig. 1a, on account of increase in frequency, and the anode-cathode voltage increases, more current will flow for a longer period of time and the field 4 will increase, thus causing the motor speed to drop. This same action, as explained in connection with Fig. 4, will delay the discharge of tube 24 and decrease current flowing in this circuit. Thus, the generator field 5 will be decreased and the voltage will be lowered. It will be noted that in Fig. 2 the direct current flows through the tube because its polarity is such as to permit it and a single transformer is sufficient for both plate circuits. The transformer 50 and condenser 53 are tuned similarly as in Fig. 1a to curve b while the input circuit 12 is tuned as curve a in Fig. 1a.

Having now described my invention, I claim:

1. Means for maintaining frequency and voltage of a motor generator having field windings, constant under varying operating conditions, comprising a pair of gaseous conducting tubes connected in shunt with said windings and means comprising tuned circuits tuned to frequencies off the operating frequency of the generator for controlling operation of said tubes and means for impressing said generator frequency and voltage upon said tuned circuits.

2. Means for maintaining frequency and voltage of a motor generator having field windings, constant under varying operating conditions, comprising a pair of gaseous conducting tubes and circuits associated therewith and with said field windings for varying the current flowing in said field windings, and means comprising tuned circuits tuned to frequencies off the operating frequency of the generator for controlling the operation of said tubes, and means for impressing said generator frequency and voltage upon said tuned circuits.

3. Means for maintaining frequency and voltage of a motor generator having field windings, constant under varying operating conditions, comprising a pair of gaseous conducting tubes and circuits associated therewith and with said field windings for varying the current flowing in said field windings, and means comprising a tuned circuit tuned to a frequency off the operating frequency of the generator for controlling the operation of said tubes, said tuned circuit and the gaseous conducting tubes and circuit being energized by the generator of said motor generator to be controlled whereby the positive half cycle or portions thereof of the alternating current energizing source are impressed upon said field windings.

4. Means for maintaining frequency and voltage of a motor generator having field windings, constant under varying operating conditions, comprising means for impressing rectified pulsating current separately on said motor and field windings including a tuned circuit tuned off the normal operating frequency of the produced alternating current supply for maintaining the frequency and voltage at a given operating point.

5. Means for maintaining frequency and voltage of a motor generator having field windings, constant under varying operating conditions, comprising a pair of gaseous conducting tubes and circuits associated therewith and with said field windings included as a part of said circuits, and means comprising a tuned input circuit and a tuned input means in said gaseous conducting tube circuit, both having means operating from said alternating current source for varying the operating condition of said tubes whereby constant frequency and voltage may be obtained.

6. Means for maintaining frequency and voltage of a motor generator having field windings, constant under varying operating conditions, comprising a pair of gaseous conducting tubes having cathode, anode and control electrodes and circuit means associated therewith and with said field windings and tuned circuit means tuned off the frequency of the alternating current supply source to be regulated for controlling the grid of one of said tubes whereby the field currents will be controlled to maintain frequency and voltage of said motor generator constant.

7. Means for maintaining the frequency of a motor generator having a motor field winding, constant under varying operating conditions, comprising a gaseous control tube having anode, cathode and a control grid and a circuit associated therewith including an anode-cathode circuit operatively connected to the motor field winding, said circuit including a pair of tuned means energized from the produced alternating current supply source and having resonant frequencies on opposite sides of the supply frequency, one of said tuning means being connected to the grid of said gaseous tube and the other in the anode circuit thereof for varying the field current to maintain the frequency constant.

8. Means for maintaining frequency and voltage of a motor generator having field windings, constant under varying operating conditions, comprising a gaseous control tube having anode, cathode and grid controlled electrodes and a circuit associated therewith including anode-cathode circuits operatively connected to the motor field winding, said circuit including a pair of tuned means energized from the produced alternating current supply source and having resonant frequencies on opposite sides of the supply frequency, one of said tuning means being connected to the grid of said gaseous tube and the other in the anode circuit thereof for varying the field current to maintain the frequency constant, and a second gaseous conducting tube having anode, cathode and grid control electrodes and circuit means operatively connected to the generator field winding, and means operative through the anode-cathode circuit of the said tube for controlling the grid of the second tube and means for impressing current of the supply source upon said second circuit whereby the generator field is controlled to maintain the supply voltage constant.

9. Means for maintaining frequency and voltage of a motor generator having field windings, constant under varying operating conditions, comprising a plurality of gaseous conducting tubes having anode, cathode and control grid electrodes and circuits associated therewith including a plurality of shunt field resistors positioned in the anode-cathode circuit of said tubes respectively for supplying said anode with a positive potential with respect to said cathode, means for impressing the supply source upon said gaseous conducting tube circuits including a tuned input circuit connected to the grid of the circuit associated with the motor field, said tuned circuit being tuned to a frequency above or below the normal operating frequency of the system and means operative through the anode-cathode circuit of said tube for controlling the operation of the other tube connected in the generator field circuit whereby the direct current supply will flow through said tubes when said tubes are operating.

WILLIAM CHRISTIAN GRABAU.